US007680285B2

(12) United States Patent
Ballantyne et al.

(10) Patent No.: US 7,680,285 B2
(45) Date of Patent: *Mar. 16, 2010

(54) ADAPTIVE ESTIMATION AND COMPENSATION OF CLOCK DRIFT IN ACOUSTIC ECHO CANCELLERS

(75) Inventors: Joseph Cox Ballantyne, Redmond, WA (US); Jack Wilson Stokes, III, North Bend, WA (US); Henrique Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

This patent is subject to a terminal disclaimer.

(21) Appl. No.: 11/465,098

(22) Filed: Aug. 16, 2006

(65) Prior Publication Data

US 2007/0047738 A1 Mar. 1, 2007

Related U.S. Application Data

(63) Continuation of application No. 10/159,075, filed on May 31, 2002, now Pat. No. 7,120,259.

(51) Int. Cl.
*A61F 11/06* (2006.01)
(52) U.S. Cl. .............................. 381/71.12; 379/406.02; 379/406.06
(58) Field of Classification Search ............ 379/406.02, 379/406.06; 381/71.12
See application file for complete search history.

(56) References Cited

U.S. PATENT DOCUMENTS 6,754,295 B1 * 6/2004 Hartnett ..................... 375/356

OTHER PUBLICATIONS

"A Theory of Clock Synchronization"; Boaz Patt-Shamir, et al; To Appear in Proc. 26th Symp. on Theory of Computing, May 1994; pp. 1-10.

* cited by examiner

*Primary Examiner*—Alexander Jamal
(74) *Attorney, Agent, or Firm*—Lee & Hayes, PLLC

(57) ABSTRACT

A system and method for adaptive estimation and compensation of clock drift in echo cancellers is provided. The invention includes an acoustic echo cancellation system with a built in adaptive clock drift compensation system. The acoustic echo cancellation system has an AEC component that performs acoustic echo cancellation on data from a capture buffer, by also using information derived from a render buffer. The clock drift compensation system has access to this capture buffer and render buffer. The clock drift compensation system includes a clock drift compensator that calculates, based on the current location of the capture data being processed by the AEC component as well as additional information, the ideal location in the render buffer from which the AEC component should process data. The clock drift compensator further adjusts the current location in the render buffer from which the AEC component processes data based, at least in part, upon this ideal location. The clock drift compensator can further detect and correct for glitches in the hardware positions received from the render and capture devices.

20 Claims, 11 Drawing Sheets

ADAPTIVE ESTIMATION AND COMPENSATION OF CLOCK DRIFT IN ACOUSTIC ECHO CANCELLERS

CROSS-REFERENCE TO RELATED APPLICATIONS

This application is a Continuation of U.S. patent application Ser. No. 10/159,075, filed May 31, 2002, and entitled, "ADAPTIVE ESTIMATION AND COMPENSATION OF CLOCK DRIFT IN ACOUSTIC ECHO CANCELLERS." The entirety of the aforementioned application is incorporated herein by reference.

TECHNICAL FIELD

The present invention relates generally to clock drift compensation, and more particularly to a system and method for adaptive estimation and compensation of clock drift in acoustic echo cancellers.

BACKGROUND OF THE INVENTION

Acoustic echo is a common problem with full duplex audio systems, for example, audio conferencing systems and/or speech recognition systems. Acoustic echo originates in a local audio loop back that occurs when an input transducer, such as a microphone, picks up audio signals from an audio output transducer, for example, a speaker, and sends it back to an originating participant. The originating participant will then hear the echo of the participant's own voice as the participant speaks. Depending on the delay, the echo may continue to be heard for some time after the originating participant has stopped speaking.

Consider the scenario where a first participant at a first physical location with a microphone and speaker and a second participant at a second physical location with a microphone and speaker are taking part in a call or conference. When the first participant speaks into the microphone at the first physical location, the second participant hears the first participant's voice played on speaker(s) at the second physical location. However, the microphone at the second physical location then picks up and transmits the first participant's voice back to the first participant's speakers. The first participant will then hear an echo of the first participant's own voice with a delay due to the round-trip transmission time. The delay before the first participant starts hearing the echo of the first participant's own voice, as well as how long the first participant continues to hear the first participant's own echo after the first participant has finished speaking depends on the time it takes to transmit the first participant's voice to the second participant, how much reverberation occurs in the second participant's room, and how long it takes to send the first participant's voice back to the first participant's speakers. This delay may be several seconds when the Internet is used for international voice conferencing.

Acoustic echo can be caused or exacerbated when sensitive microphone(s) are used, as well as when the microphone and/or speaker gain (volume) is turned up to a high level, and also when the microphone and speaker(s) are positioned so that the microphone is close to one or more of the speakers. In addition to being annoying, acoustic echo can prevent normal conversation among participants in a conference. In full duplex systems without acoustic echo cancellation, it is possible for the system to get into a feedback loop which makes so much noise the system is unusable.

Conventionally, acoustic echo is reduced using audio headset(s) that prevent an audio input transducer (e.g., microphone) from picking up the audio output signal. Additionally, special microphones with echo suppression features can be utilized. However, these microphones are typically expensive as they may contain digital signal processing electronics that scan the incoming audio signal and detect and cancel acoustic echo. Some microphones are designed to be very directional, which can also help reduce acoustic echo.

Acoustic echo can also be reduced through the use of a digital acoustic echo cancellation (AEC) component. This AEC component can remove the echo from a signal while minimizing audible distortion of that signal. This AEC component must have access to digital samples of the audio input and output signals. These components process the input and output samples in the digital domain in such a way as to reduce the echo in the input or capture samples to a level that is normally inaudible.

An analog waveform is converted to digital samples through a process known as analog to digital (A/D) conversion. Devices that perform this conversion are known as analog to digital converters, or A/D converters. Digital samples are converted to an analog waveform through a process known as digital to analog (D/A) conversion. Devices that perform this conversion are known as digital to analog converters, or D/A converters. Most A/D and D/A conversions are performed at a constant sampling rate. Inexpensive silicon chips that do both A/D and D/A conversion on the same chip are widely available. Usually these chips are designed to be connected to a crystal which is used to generate a stable and fixed frequency clock signal. This clock signal is used to drive the A/D and/or D/A conversion process. Normally this clock is running at a very high frequency, and is divided down to a much lower rate which is the sampling rate driving the conversion process. The rate at which digital samples are produced by an A/D converter is determined by the frequency of the clock which is driving the A/D converter as well as the divider used to reduce that frequency to the desired sampling rate. The rate at which digital samples are consumed by a D/A converter is also determined by the frequency of the clock which is driving the D/A converter and the divider used to reduce that frequency to the desired sampling rate. As long as the A/D and D/A converters are driven by single clock and they are divided down by the same divider, they will sample at the same frequency and the relationship between the input and output samples will not change over time. In any period of time, the A/D will produce exactly the same number of samples as are consumed by the D/A.

Crystals have varying levels of performance. Some of the parameters that can be specified for a crystal are frequency, stability, accuracy (in parts per million, or ppm), as well as limits on the variation in the above parameters due to temperature changes. In general, no two crystals are exactly the same. They will oscillate at slightly different frequencies, and their other characteristics will differ as well. This means that if the A/D and D/A converters are driven by clock signals derived from different crystals, there will be a slight difference in the rate at which those converters will run, even when the crystals run at the same nominal frequency, and the dividers for the A/D and D/A match. In this case, the number of samples produced over time by the A/D will not match the number of samples consumed in the same period of time by the D/A. The longer this period of time during which the number of samples generated by the A/D is compared to the number of samples consumed by the D/A, the greater the difference in the number of samples processed by the A/D and D/A.

This clock drift can also occur when the A/D and D/A are driven by the same clock, but are running at different sample rates. If those differing rates are generated by dividers that approximate the sample rate, but are not exact, and then those rates that are slightly off, are converted from their nominal but not exact rate to the same rate by sample rate converters that are part of an AEC system, then there will be a drift between the capture and render sample rates even though the A/D and D/A are driven by the same clock. For example, many modern inexpensive codecs used on computer sound cards, are driven by a clock signal of 14.318184 MHz. This is a clock frequency that has been supported in personal computers for over 20 years. Crystals for this frequency are therefore very inexpensive. However, standard sampling rates of 44100 Hz and 48000 Hz do not evenly divide into 14.318184 MHz. This means that this type of codec will not be able to sample at the above frequencies with very high accuracy of the sample rate. An example calculation of the actual rates produced by such codecs follows below. Unfortunately the rates are much less accurate than the ppm accuracy of most crystals—which are normally accurate to within 100 ppm.

Acoustic echo cancellation components work by subtracting a filtered version of the audio samples sent to the output device from the audio samples received from the input device. This processing assumes that the output and input sampling rates are exactly the same. Because there are a wide variety of input and output devices available for PC devices, it is important that AEC work even when the input and output devices are not the same. Additionally, many USB cameras have a built in microphone that can be used for capturing audio. It is important that AEC be able to utilize this capture signal while the playback device be one that was shipped with the computer and is generally not a USB device. Unless the AEC component can function properly in these types of scenarios, effective acoustic echo cancellation will be difficult or impossible and that will result in a frustrating experience for end user(s).

A full duplex audio system has a render device and a capture device. The render device has a digital to analog converter (D/A) that converts digital samples to an analog voltage level at a rate set by a render clock. The capture device has an analog to digital converter (A/D) that converts an analog voltage level to digital samples at a rate set by a capture clock.

When the D/A and the A/D are driven by the same clock signal, and are sampling at the same sample rate, there is no need to compensate for differences in the sample rates, because they are exactly identical. However, when the D/A is driven by a first clock signal and the A/D is driven by a second clock signal, the first clock signal and the second clock signal will not be running at exactly the same rates. The rates may differ by only 1 part per million (1 ppm) or even by only 1 part per billion (1 ppb), but over time this means that the number of samples consumed by the D/A will differ from the number of samples produced by the A/D. Most AEC algorithms are not designed to properly operate for long periods of time when the D/A and A/D sample rates are not exactly the same. In addition, most clock signals derived from separate crystals differ by much more than 1 ppm. This means that it takes only a few minutes before the number of samples consumed by the D/A differs significantly from the number of samples produced by the A/D. For example, assume that an A/D and D/A are both running at a nominal sample rate of 16 kHz, but that their clocks differ by 80 ppm. This means that every 1600000 samples produced by the A/D, the D/A consumes 1600128 samples if it is running faster than the A/D. So every 100 seconds, the difference in the number of samples increases by another 128. In another example, assume the A/D and D/A are driven by the same clock, but are running at different sample rates, and that the clock signal is not exactly divisible by the sample rates. If the common crystal frequency of 14.318184 MHz and common sample rates of 44100 Hz, and 48000 Hz are chosen, then the dividers with the least amount of error for those 2 rates are 325 and 298. This means actual sample rates of about 44055.95 Hz, and about 48047.60 Hz are obtained. If these rates are both converted to a nominal 16000 Hz rate assuming that they really were 44100 Hz and 48000 Hz, rates of about 15984.02 Hz and 16015.87 Hz are obtained. These sample rates differ by about 1992 ppm! The difference between these rates is 3 1.85 samples every second.

In both of the above cases, if the sample rate differences are not properly compensated for, the AEC algorithm will be unable to properly cancel the echo over extended periods of time. The larger the difference between the actual sample rates of the A/D and D/A the quicker the AEC algorithm will fail to cancel the echo. With a good clock drift compensation algorithm, the AEC algorithm can properly cancel the echo indefinitely.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a system for adaptive estimation and compensation of clock drift in echo cancellers. The system includes a capture buffer, a render buffer, a clock drift compensator and an AEC component utilizing an AEC algorithm. Optionally, the system can include a capture driver for the capture device, render driver(s) for the render device(s), a mixer and/or a splitter.

As discussed previously, without AEC, captured audio input can include an echo from sound(s) played from speaker(s). The AEC algorithm can be used by application(s), such as video conferencing system(s) and/or speech recognition engine(s) to reduce the echo due to acoustic feedback from a speaker to a microphone. For example, the AEC algorithm can use an adaptive filter to model the impulse response of the room. The echo is either removed (cancelled) or reduced once the adaptive filter converges by subtracting the output of the adaptive filter from the audio input signal (e.g., by a differential component). Failed or lost convergence of the adaptive filter may result in the perception of echo or audible distortion by the end user.

The acoustic echo cancellation clock drift compensation system can compensate for clock drift between a render device(s) and a capture device. This clock drift can cause problem(s) for the AEC algorithm attempting to adaptively model the impulse response of the room since render information provided to the AEC algorithm would not generally stay synchronized to the capture information received from the capture driver.

The acoustic echo cancellation clock drift compensation system compensates for clock drift by adjusting the render information sent to the AEC component. Thus, the render information from which AEC will be performed is "slaved to" the capture information (e.g. received from a microphone).

The capture buffer includes capture data, a capture write pointer and a capture read pointer. Similarly, the render buffer includes render data, a render write pointer and a render read pointer.

The clock drift compensator calculates a capture delay and a render offset. Based, at least in part, upon the calculated capture delay and the render offset, the clock drift compensator can adjust the render read pointer. Thereafter, the AEC component performs acoustic echo cancellation of the capture data based, at least in part, upon the adjusted render read pointer.

Additionally, a determination can be made by the clock drift compensator as to whether the actual render offset is outside of a threshold window centered around the ideal render offset. In this case a "glitch" is deemed to have occurred and the render read pointer is set to its ideal location based on the calculated ideal render offset. Otherwise, the difference between the actual render offset and the ideal render offset is filtered and the filtered result is used to adjust the render read pointer.

Yet another aspect of the present invention provides for an acoustic echo cancellation clock drift compensation system comprising means for buffering capture data, the means for buffering capture data having a capture write pointer and a capture read pointer; means for buffering render data, the means for buffering render data having a render write pointer and a render read pointer; means for compensating clock drift, the means for compensating clock drift calculating a capture delay and a render offset, the means for compensating clock drift adjusting the render read pointer based, at least in part, upon the calculated capture delay and render offset; and, means for performing acoustic echo cancellation of the capture data, the means for performing acoustic echo cancellation utilizing the adjusted render read pointer.

Other aspects of the present invention provide a method for acoustic echo cancellation clock drift compensation, a computer readable medium having computer executable components for a system facilitating acoustic echo cancellation clock drift compensation, and a data packet adapted to be transmitted between two or more computer processes comprising render output data for an acoustic echo cancellation algorithm, the render output data being based upon an adjusted render read pointer based, at least in part, upon a calculated capture delay and render offset.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
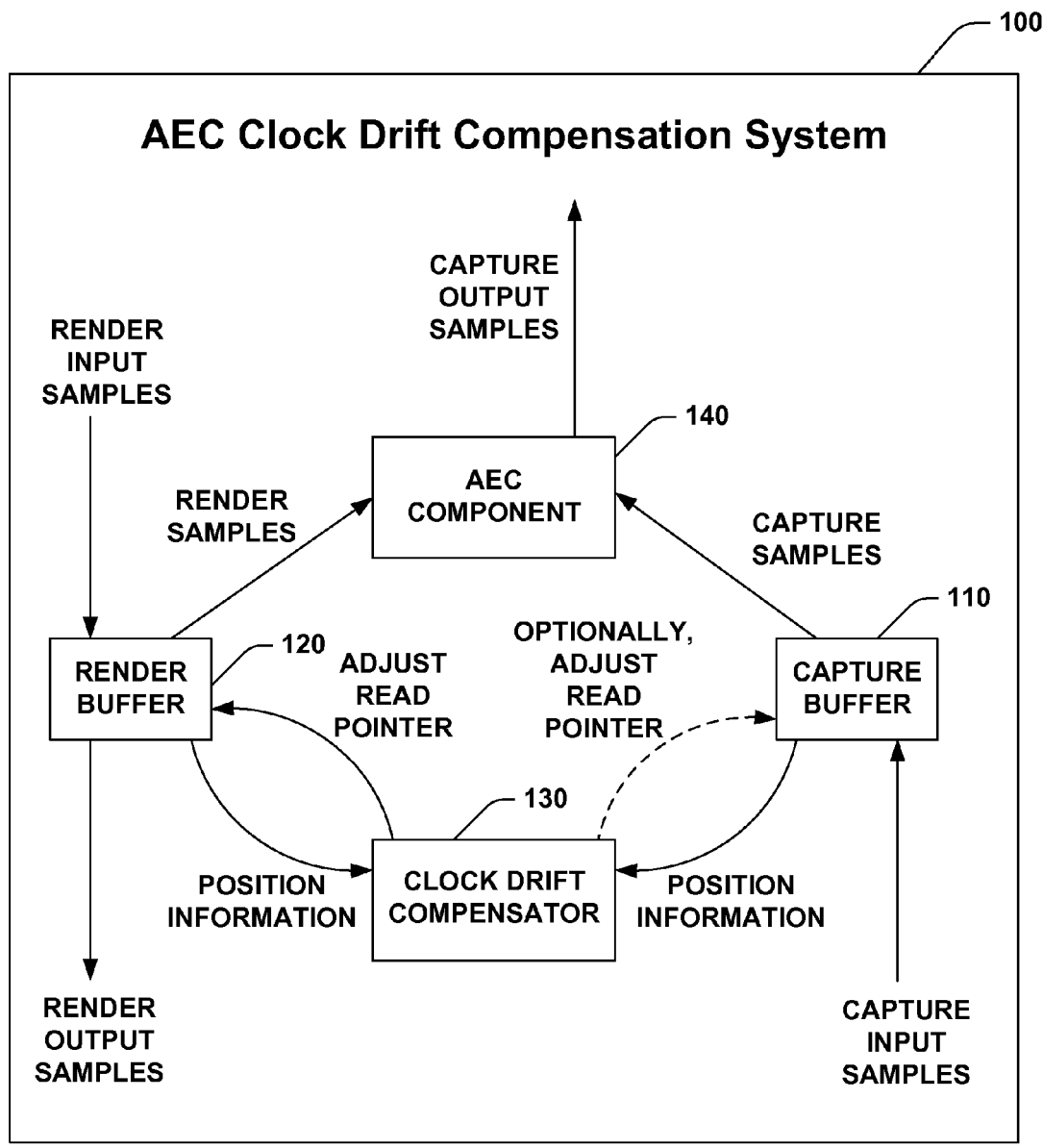
FIG. 1 is a block diagram of an acoustic echo cancellation clock drift compensation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, a driver, and/or a computer. By way of illustration, both an application running on a server and the server can be a computer component. One or more computer components may reside within a process and/or thread of execution and a component may be localized on one computer and/or distributed between two or more computers.

Referring to FIG. 1, an acoustic echo cancellation (AEC) clock drift compensation system 100 in accordance with an aspect of the present invention is illustrated. The system 100 includes a capture buffer 110, a render buffer 120, a clock drift compensator 130 and an AEC component 140. The capture buffer 110 is loaded with capture information that originates in a capture device (not shown). This capture information is later sent to the AEC component as needed. The render buffer 120 is loaded with render information that originates from other computer components. This render information is sent to a render device (not shown) as soon as possible. The render information is also later sent to the AEC component as needed. The clock drift compensator 130 requests position information from the render buffer and render device, as well as from the capture buffer and the capture device. It uses this position information to determine the relationship between the hardware clocks on the render and capture device.

Figure 2:
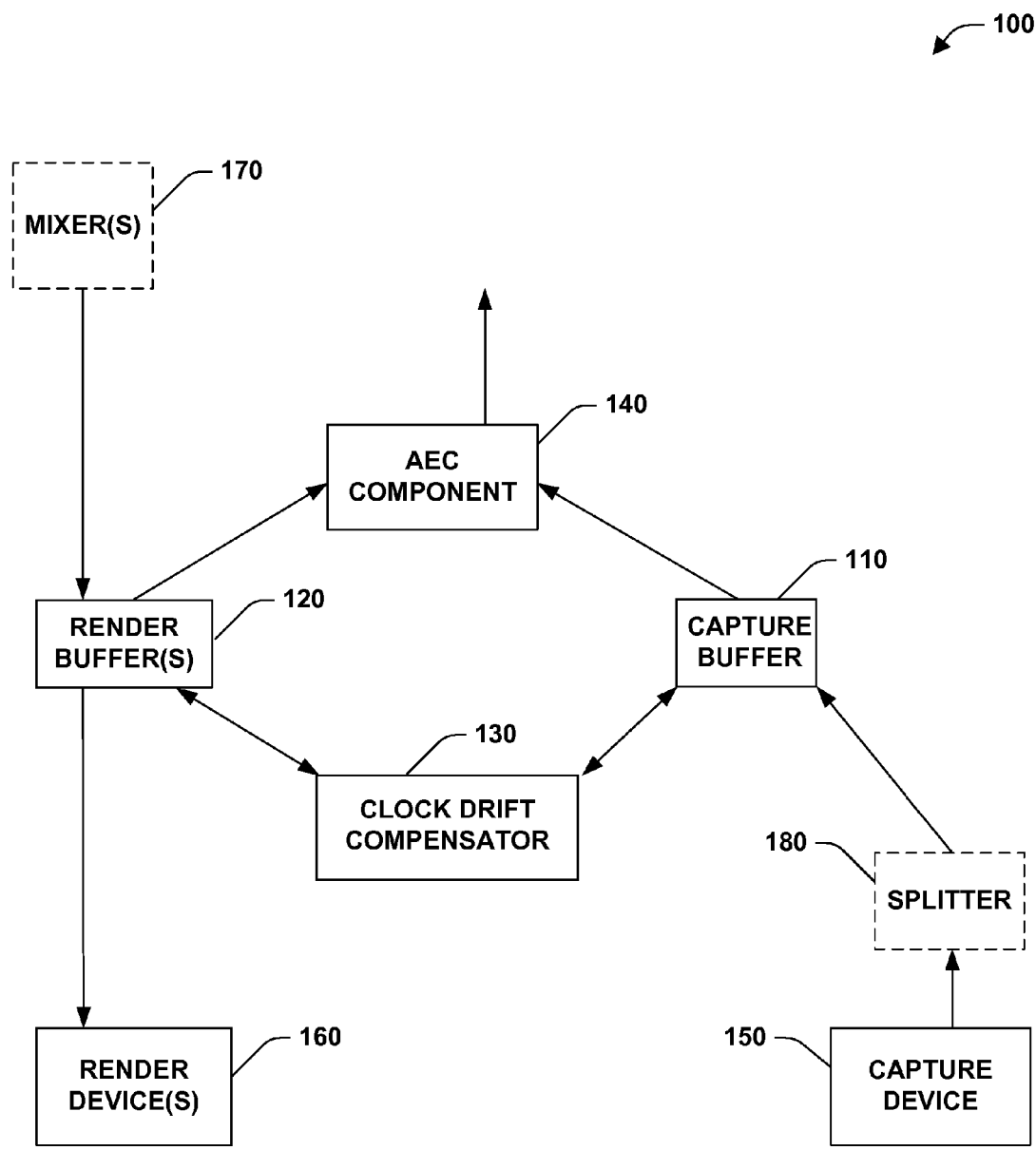
FIG. 2 is a block diagram of an acoustic echo cancellation clock drift compensation system in accordance with an aspect of the present invention.

As illustrated in FIG. 2, the system 100 includes a capture device 150, render device(s) 160, and optionally a mixer 170 and/or a splitter 180.

As discussed previously, without AEC, captured audio input can include an echo from sound(s) played from a render transducer (e.g. speaker(s)). The AEC algorithm can be used by application(s), such as video conferencing system(s) and/or speech recognition engine(s) to reduce the echo due to acoustic feedback from a render transducer (not shown) to a capture transducer (e.g., microphone) (not shown). For example, the AEC algorithm can use an adaptive filter to model the impulse response of the room. The echo is either removed (cancelled) or reduced once the adaptive filter converges by subtracting the output of the adaptive filter from the audio input signal by a differential component (not shown). Failed or lost convergence of the adaptive filter may result in the perception of echo or audible distortion by the end user.

The acoustic echo cancellation clock drift compensation system 100 can compensate for clock drift between render devices(s) 160 and the capture device 150. The render device(s) 160 have digital to analog converter(s) (D/As) that convert digital audio sample values into analog electrical waveform(s) at a rate set by a clock signal. The analog waveform drives render transducer(s) (not shown) which convert the electrical waveform into a sound pressure level. Similarly, a capture transducer (not shown) converts a sound pressure level into an analog electrical waveform. The capture device 150 has an analog to digital converter (A/D) that converts this analog electrical waveform from the capture transducer (not shown) into digital audio sample values at a rate set by a clock signal.

In the instance where the D/A on the render device(s) 160 and the A/D on the capture device 150 are driven by the same clock signal, and are sampling at the same rate, there is no need for clock drift compensation. However, when the D/A is driven by a first clock signal and the A/D is driven by a second clock signal, the first clock signal and the second clock signal will run at slightly different rates. This means that the location in time of the render and capture samples relative to each other will drift. Also, the number of capture samples produced by the A/D over a long period of time will differ from the number of render samples consumed by the D/A in that same period of time. This clock drift can cause problem(s) for the AEC algorithm attempting to adaptively model the impulse response of the room since render information provided to the AEC algorithm would not generally stay synchronized with the capture information received from the capture driver.

This clock drift can also occur when the A/D and D/A are driven by the same clock, but are running at different sample rates. For example, many modern inexpensive codecs used on computer sound cards, are driven by a clock signal of 14.318184 MHz. This is a clock frequency that has been used in personal computers for over 20 years. It is actually 4 times the NTSC television color burst frequency of 3.579545 MHz. Crystals for this frequency are therefore very inexpensive. However, standard sampling rates of 8 kHz, 16 kHz, 32 kHz, 48 kHz, 11025 Hz, 22050 Hz, and 44100 Hz do not evenly divide into 14,318,184 Hz. This means that devices that use these codecs will not run at exactly the above standard sampling rates. The actual sampling rate they run at will be off by a small fraction. 48000 Hz divides into 14318184 Hz about 298.296 times. The closest an integral divisor can get to that sample rate is therefore 14318184/298 which is approximately 48047.6 Hz. This rate is too high by 992 parts per million (ppm). 44100 Hz divides into 14318184 Hz about 324.675 times. The closest integral divisor is therefore 325, which yields a sample rate of 14318184/325 or about 44056 Hz. This rate is too slow by about 1000 ppm. This means that if capture is running nominally at 48000 Hz and playback is running nominally at 44100 Hz, even on a device with a single codec driven by the same crystal, and the 48000 Hz samples are converted with an SRC to 16000 Hz, and the 44100 Hz samples are converted with an SRC to 16000 Hz, the 2 nominally 16000 Hz signals will be off by about 1992 ppm. This is a huge difference considering that most crystals are accurate to 100 ppm or less and occurs because the 48000 Hz signal is actually about 48047 Hz, and converts to about 16015. The 44100 Hz signal is actually about 44056 Hz and converts to about 15984 Hz. The difference results from truncating the non integral divisors to their closest integral value.

AEC clock drift compensation may be required even when capture and render are supported by a single device and are implemented by a single codec driven by the same clock, but are running at different sample rates.

The acoustic echo cancellation clock drift compensation system 100 compensates for clock drift by adjusting the render information sent to the AEC component 140. This is implemented by adjusting the render read pointer used by the AEC component 140 to access the render information in the render buffer 120. Thus, the render information upon which AEC will be performed is "slaved to" the capture information. Alternatively the clock drift compensation system 100 can compensate for clock drift by adjusting the capture information sent to the AEC component 140. This can be implemented by adjusting the capture read pointer used by the AEC component 140 to access the capture information in the capture buffer 110. This alternative slaves the capture information to the render information.

The capture buffer 110 stores capture information received from the capture device 150. The capture information is generated in the capture device 150 by an A/D which is connected to a capture transducer (e.g., microphone) (not shown). The capture buffer 110 acts as a temporary storage area for capture information between the capture device 150 and/or splitter 180 and the AEC component 140.

Figure 3:
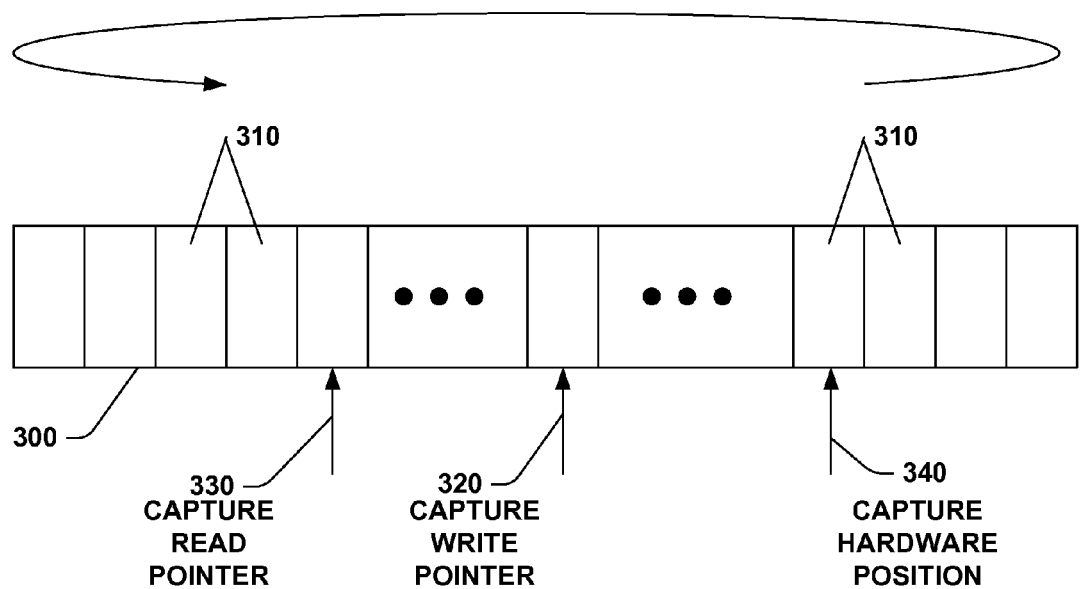
FIG. 3 is a block diagram of an exemplary capture buffer in accordance with an aspect of the present invention.

In FIG. 3, an exemplary capture buffer 300 in accordance with an aspect of the present invention is illustrated. The capture buffer 300 is a circular buffer comprising a plurality of storage units 310. In one implementation, capture information is stored in the capture buffer 300 after it is received from the capture device 150 in a sequential fashion from lowest storage unit to the highest storage unit. As capture information is stored into the capture buffer 300, a capture write pointer 320 is increased (e.g., incremented).

In one implementation the capture write pointer 320 identifies the location for the next unit of capture information to be stored (e.g., capture write pointer 320 increased after storing capture information). In an alternate implementation, the capture write pointer 320 identifies the location of the most recent unit of capture information stored (e.g. write pointer increased prior to storing capture information).

Once the storage unit in the highest location of the capture buffer 300 is loaded with capture information, capture information is stored in the lowest location and thereafter again proceeds in a direction from the lowest location towards the highest location. Thus the capture buffer 300 is used as a circular buffer for holding samples from the capture device 150. The capture buffer 300 holds the samples until there are a sufficient number available for the AEC component 140 to process. The capture buffer 300 furthermore can be implemented so that the AEC component 140 can process a linear block of samples without having to know the boundaries of the circular buffer. This is done by having an extra block of memory that follows and is contiguous with the circular buffer. Whenever data is copied into the beginning of the circular buffer, it is also copied into this extra space that follows the circular buffer. The amount of extra space is determined by the AEC component 140. The AEC component 140 processes a certain number of blocks of samples. The size of this extra block of memory is equal to the number of samples contained in these blocks of samples that are processed by the AEC component 140. Thus, when the AEC component 140 is passed a pointer to capture data, and that pointer is close to the end of the circular buffer 300 (e.g., the distance from the pointer to the end of the circular capture buffer 300 is less than the number of samples that will be processed by the AEC component 140) it does not matter, because the data required by the AEC component 140 that is at the start of the circular buffer, is also available after the end of the circular buffer in a linear contiguous fashion. The AEC component 140 thus processes a linear block of samples and can be ignorant of the fact that the capture buffer 300 is circular in nature. Without this additional feature some of the processing code in the AEC component would have to be aware of capture buffer wrap issues. Note that whenever the size of the capture buffer is used in calculations, this extra space for linearizing AEC buffer processing is NOT included as part of that size. The size of the capture buffer is simply the number of storage units in the circular buffer itself.

When the capture information in the capture buffer 300 is processed by the AEC component 140 the capture read pointer 330 is increased (e.g., incremented). In one implementation, the capture read pointer 330 identifies the location for the next unit of capture information to be processed (e.g., capture read pointer 330 increased after processing of capture information). Furthermore, the capture read pointer is increased by the size of one block of capture samples (e.g. FrameSize). In another implementation, the capture read pointer 330 identifies the location of the last unit of capture information removed (e.g., capture read pointer 330 increased prior to removal of capture information).

Generally, the storage units 310 between the capture read pointer 330 and the capture write pointer 320 comprise valid capture information. In other words, when the capture read pointer 330 is less than the capture write pointer 320, then storage units with a location that is greater than or equal to the capture read pointer 330, and less than the capture write pointer 320 contain valid unprocessed capture samples. The capture write pointer 320 typically leads the capture read pointer 330, except when the capture write pointer 320 has wrapped from the end of the circular buffer to the beginning, and the capture read pointer 330 has not yet wrapped. When the capture read pointer 330 and the capture write pointer 320 are equal, the capture buffer is considered empty.

The capture device (not shown) also has a capture hardware position 340. This capture hardware position 340 indicates how many capture samples have been generated by the capture device including samples that may not have yet been sent to the capture buffer 300. As capture information is placed into the capture buffer 300, for example, by the driver for the capture device 150, the capture input bytes processed count is increased. This is a count of the total number of bytes that have been sent to the capture buffer by the capture device 150, and can be directly converted into a count of the number of samples that have been sent from the capture device 150 to the capture buffer 300. The capture hardware position 340 should always be greater than or equal to the number of capture samples sent to the capture buffer 300. Thus, conceptually the capture hardware position 340 typically leads the capture write pointer 320.

Referring back to FIG. 1 and FIG. 2, the render buffer 120 stores render information received from another software component that is playing audio data. This software component can be a mixer 170 that is mixing audio from multiple sources and clients, or some other source of a single stream of audio data that should be played on the render device. In one implementation, the render information is always received from a system mixer. The render information is usually PCM audio samples that will be sent to the D/A on the render device which is connected to a render transducer(s) (e.g., integrated computer speaker(s), free standing speaker(s) and/or a speaker phone) (not shown). The render buffer 120 acts as a temporary storage area for render information sent to the render device(s) 160.

Figure 4:
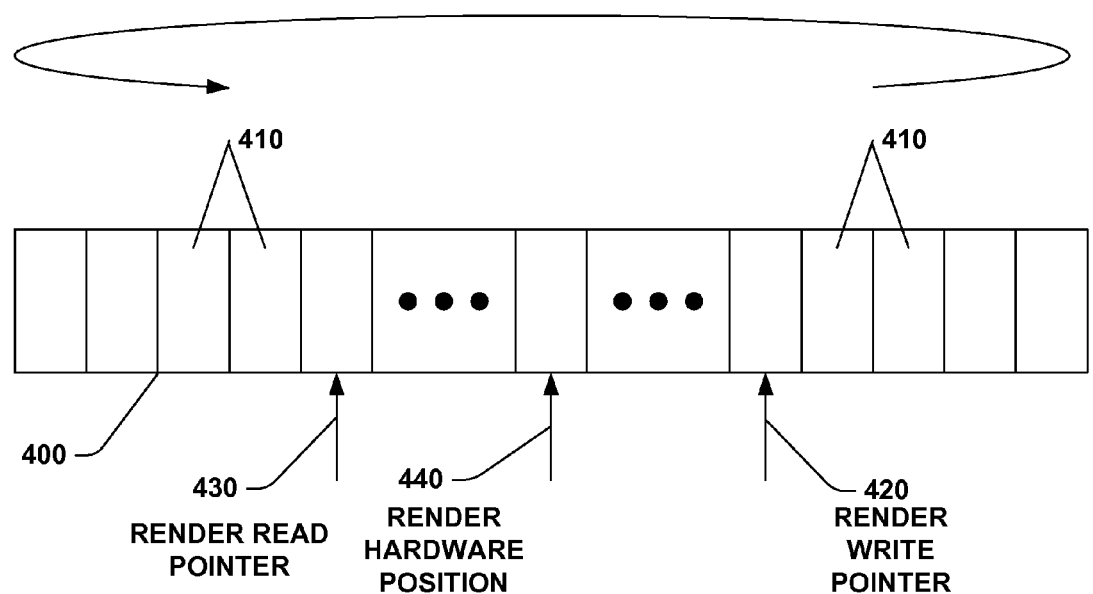
FIG. 4 is a block diagram of an exemplary render buffer in accordance with an aspect of the present invention.
Figure 5:
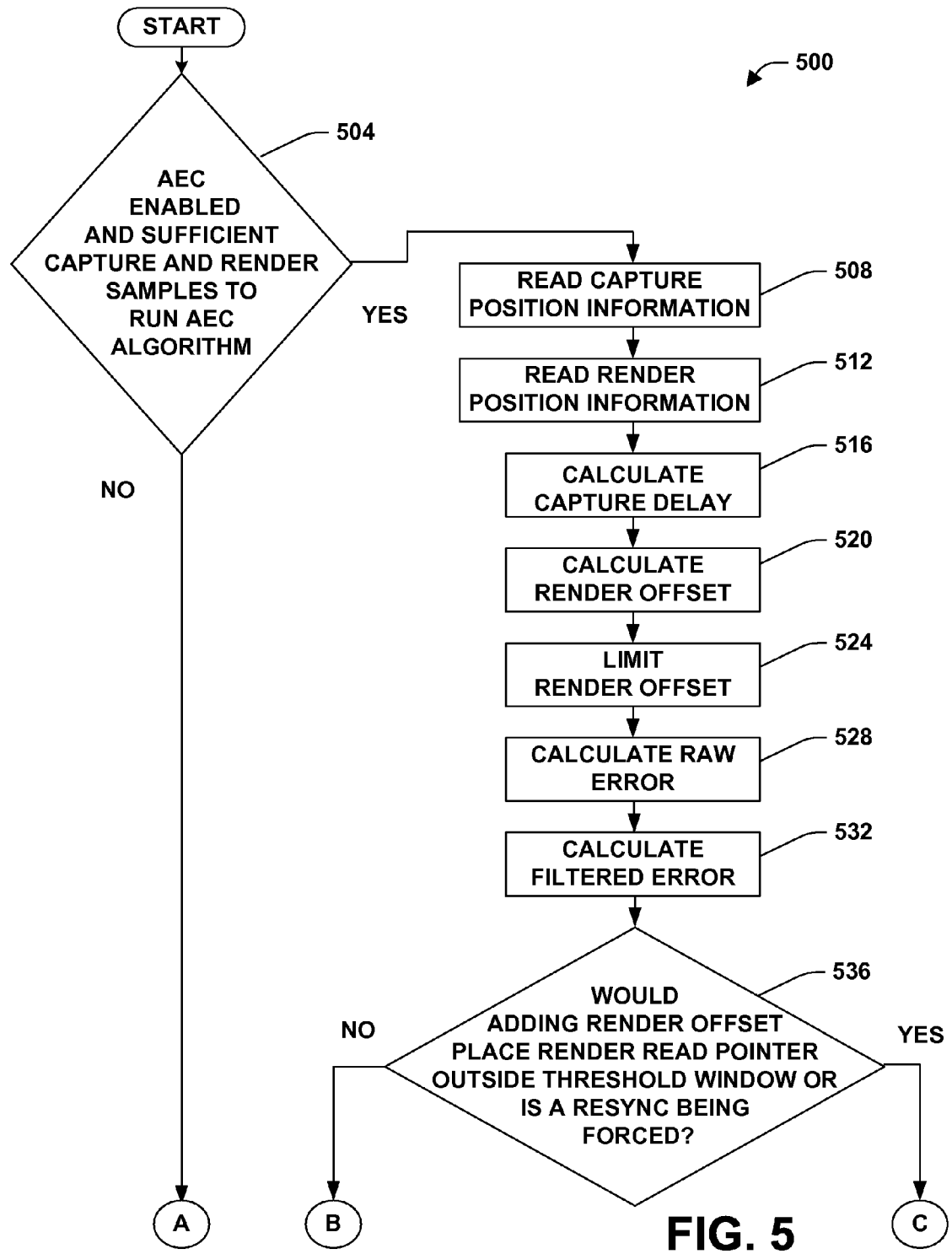
FIG. 5 is a flow chart illustrating a method for acoustic echo cancellation clock drift compensation in accordance with an aspect of the present invention.
Figure 6:
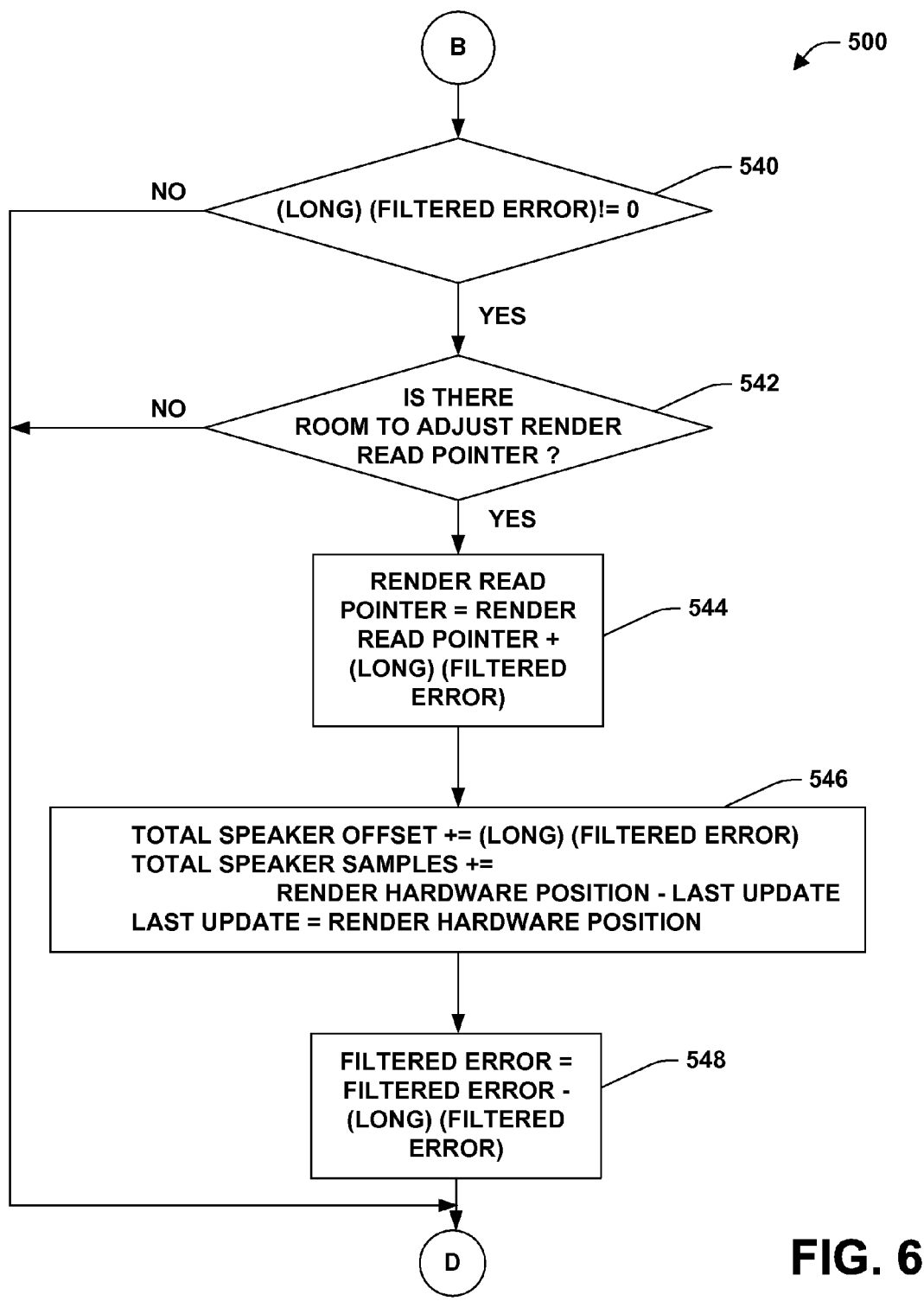
FIG. 6 is a flow chart further illustrating the method of FIG. 5.
Figure 7:
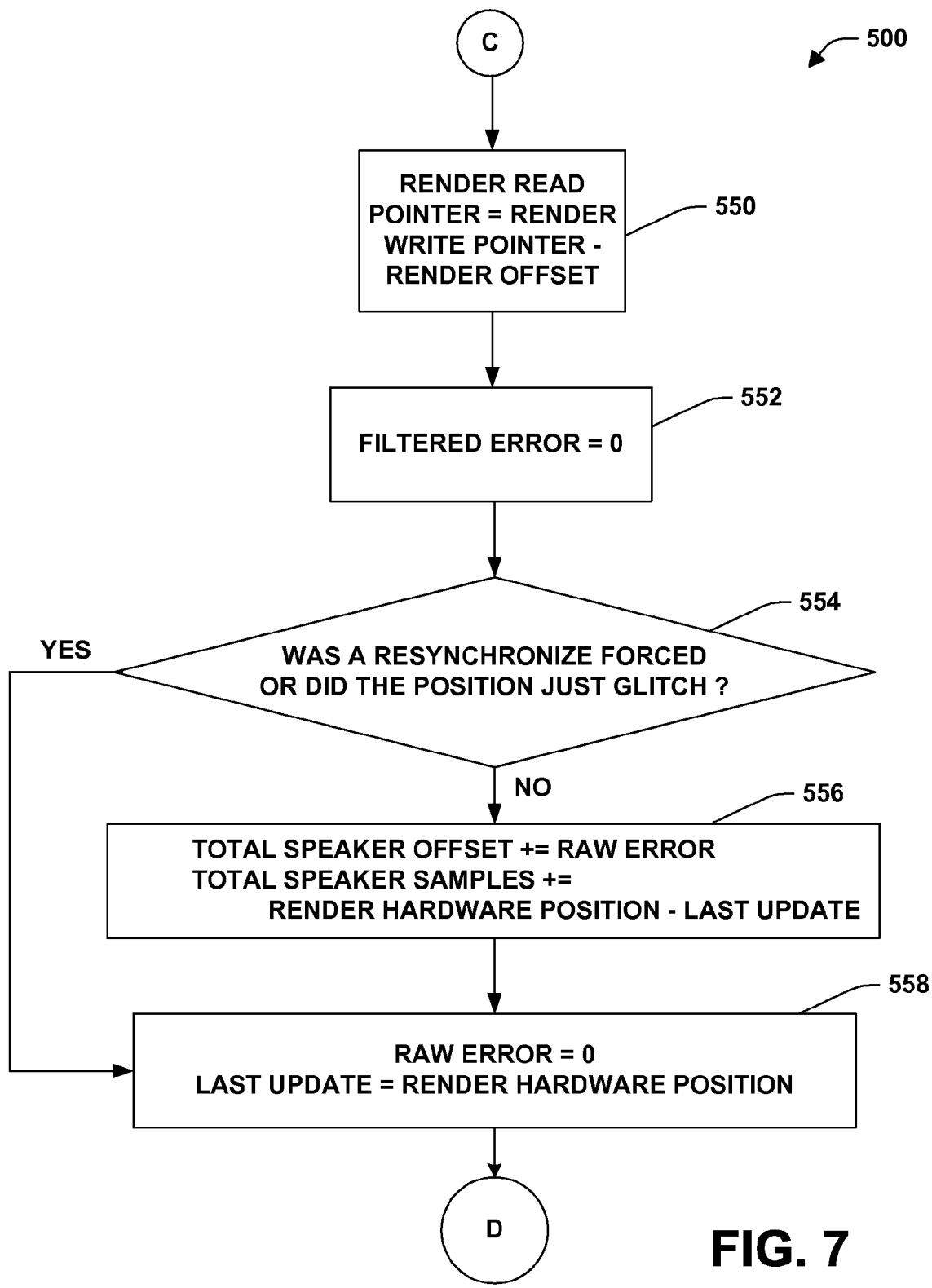
FIG. 7 is a flow chart further illustrating the method of FIGS. 5 and 6.
Figure 8:
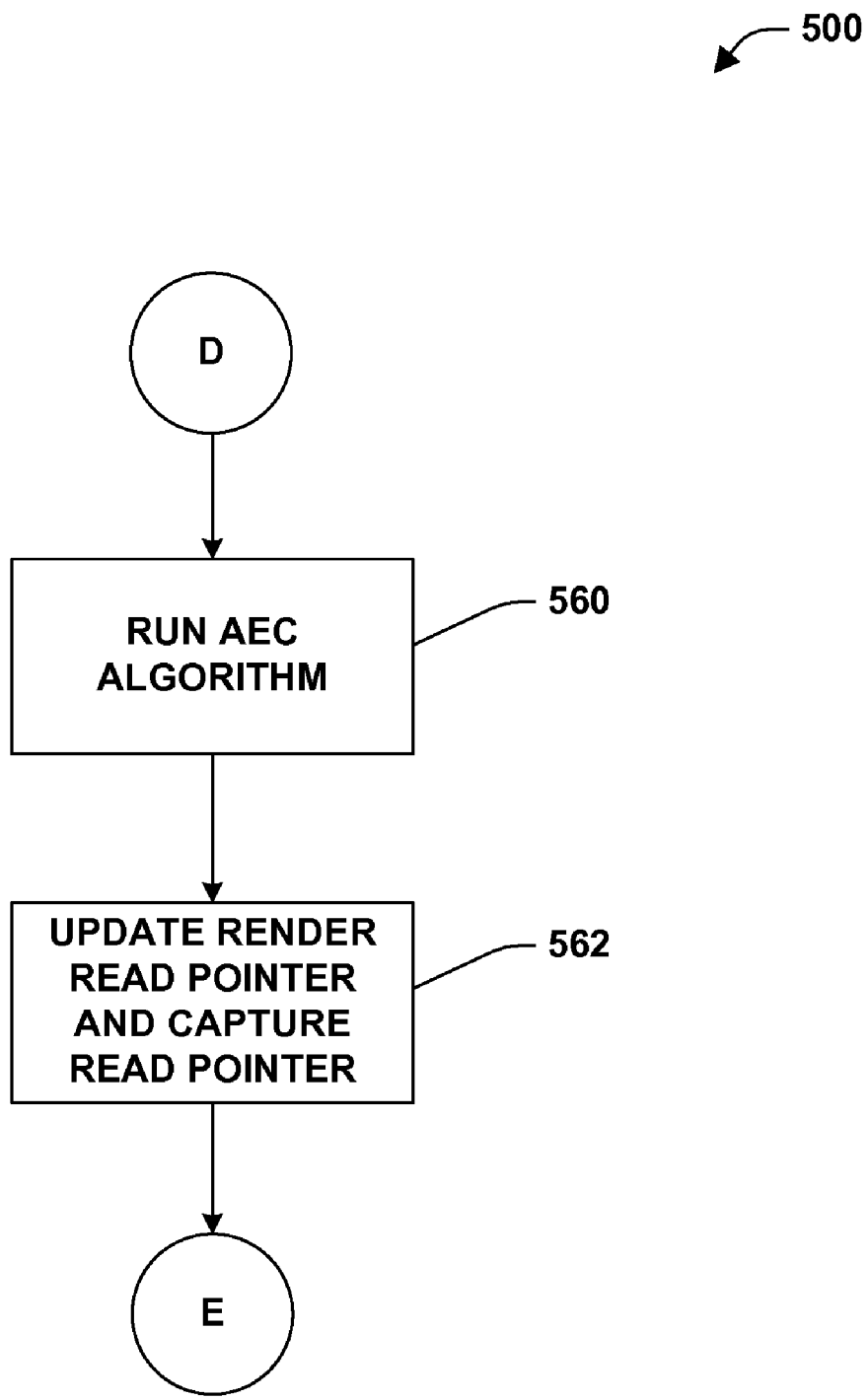
FIG. 8 is a flow chart further illustrating the method of FIGS. 5, 6 and 7.
Figure 9:
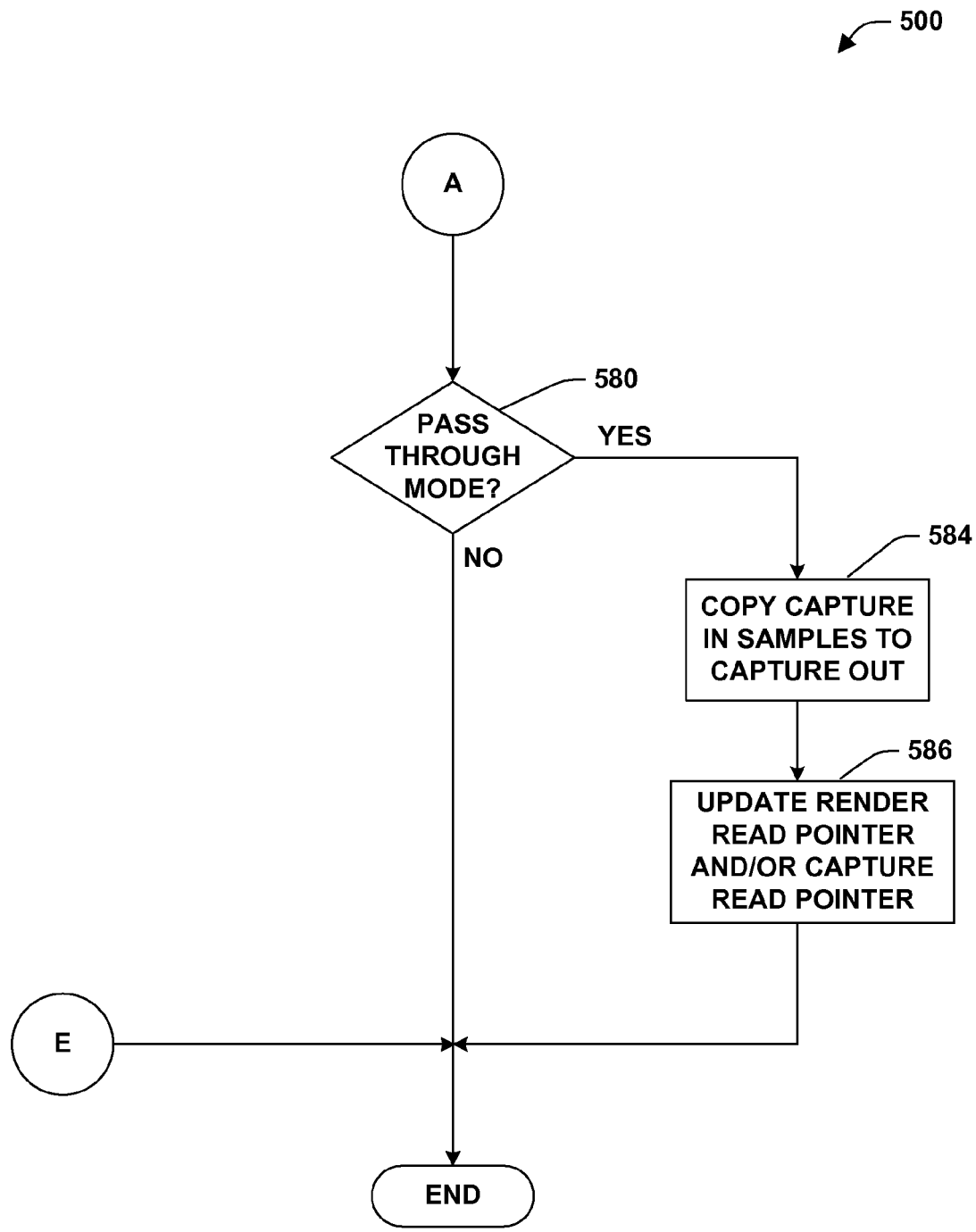
FIG. 9 is a flow chart further illustrating the method of FIGS. 5, 6, 7 and 8.

In FIG. 4, an exemplary render buffer 400 in accordance with an aspect of the present invention is illustrated. The render buffer 400 is a circular buffer comprising a plurality of storage units 410. In one implementation, render information is stored in the render buffer 400 before it is sent to the render device(s) 160 in a sequential fashion direction from lowest storage unit to the highest storage unit. As render information is stored into the render buffer 400, a render write pointer 420 is increased (e.g., incremented).

In one implementation the render write pointer 420 identifies the location for the next unit of render information to be stored (e.g., render write pointer 420 increased after storing render information). In an alternate implementation, the render write pointer 420 identifies the location of the most recent unit of render information stored (e.g., render write pointer increased prior to storing render information).

Once the storage unit in the highest location of the render buffer 400 is loaded with render information, render information is stored in the lowest location and thereafter again proceeds in a direction from the lowest location towards the highest location. Thus the render buffer 400 is used as a circular buffer for holding samples sent to the render device(s) 160. The render buffer 400 holds the samples until there are a sufficient number available for the AEC component 140 to process. The render buffer 400 furthermore can be implemented so that the AEC component 140 can process a linear block of samples without having to know the boundaries of the circular buffer. This is done by having an extra block of memory that follows and is contiguous with the circular buffer. Whenever data is copied into the beginning of the circular buffer, it is also copied into this extra space that follows the circular buffer. The amount of extra space is determined by the AEC component 140. The AEC component 140 processes a certain number of blocks of samples. The size of this extra block of memory is equal to the number of samples contained in these blocks of samples that are processed by the AEC component 140. Thus, when the AEC component 140 is passed a pointer to render data, and that pointer is close to the end of the circular buffer (e.g., the distance from the pointer to the end of the circular render buffer 400 is less than the number of samples that will be processed by the AEC component) it does not matter, because the data required by the AEC component 140 that is at the start of the circular render buffer 400, is also available after the end of the circular render buffer 400 in a linear contiguous fashion. The AEC component 140 thus processes a linear block of samples and can be ignorant of the fact that the render buffer 400 is circular in nature. Without this additional feature some of the processing code in the AEC component 140 would have to be aware of render buffer wrap issues. Note that whenever the size of the render buffer is used in calculations, this extra space for linearizing AEC buffer processing is NOT included as part of that size. The size of the render buffer is simply the number of storage unit in the circular buffer itself When the render information in the render buffer 400 is processed by the AEC component 140, the render read pointer 430 is increased (e.g., incremented). In one implementation, the render read pointer 430 identifies the location for the next unit of render information to be processed (e.g., render read pointer 430 increased after processing of render information). Furthermore, the render read pointer is increased by the size of one block of capture samples (e.g., FrameSize). In another implementation, the render read pointer 430 identifies the location of the last unit of render information removed (e.g., render read pointer 430 increased prior to removal of render information).

Generally, the storage units 410 between the render read pointer 430 and the render write pointer 420 comprise valid render information. In other words, when the render read pointer 430 is less than the render write pointer 420, then storage units 410 with a location that is greater than or equal to the render read pointer 430, and less than the render write pointer 420 contain valid unprocessed render samples. The render write pointer 420 typically leads the render read pointer 430, except when the render write pointer 420 has wrapped from the end of the circular buffer to the beginning, and the render read pointer 430 has not yet wrapped. When the render read pointer 430 and the render write pointer 420 are equal, the capture buffer is considered empty.

The render device also has a render hardware position 440. This render hardware position indicates how many render samples have been consumed by the render device. As render information is placed into the render buffer 400 the render input bytes processed count is increased. This is a count of the total number of bytes that have been sent to the render device, and can be directly converted into a count of the number of samples that have been sent to the render device. The render hardware position 440 should always be less than or equal to the number of render samples sent to the render buffer. Thus, conceptually the render hardware position 440 typically lags the render write pointer 420.

Referring back to FIG. 1, the clock drift compensator 130 compensates for clock drift between the capture device and the render device, by adjusting the render information sent to the AEC component 140. Thus, the render information upon which AEC by the AEC component 140 is performed is "slaved to" the capture information received from the capture device.

The clock drift compensator 130 calculates a capture delay and a render offset. The clock drift compensator 130 adjusts the render read pointer based, at least in part, upon the calculated capture delay and the render offset.

The clock drift compensator 130 can obtain capture position information associated with the capture buffer 110, for example, the capture write pointer, the capture read pointer, the capture hardware position, and the capture input bytes processed (e.g., a running count of the total number of capture bytes loaded into the capture buffer). The clock drift compensator 130 can further obtain render position information associated with the render buffer 120, for example, the render write pointer, the render read pointer, the render hardware position, and the render output bytes processed (e.g., a running count of the total number of render bytes loaded into the render buffer).

The clock drift compensator 130 calculates a capture delay based, at least in part, upon the capture position information. Table 1 shows pseudo code for exemplary capture delay calculations:

TABLE 1 capture delay = capture hardware position − capture input bytes processed
if (capture delay < 0 ) then capture delay = 0
capture delay /= capture input sample rate conversion (SRC) factor
capture delay /= capture input connection format number of channels
capture delay /= capture input connection format bytes per sample
capture delay += (capture write pointer − capture read pointer + capture
    buffer size) MODULO (capture buffer size)

Capture hardware position is the hardware position of the capture device. Capture input bytes processed is the total number of bytes loaded into the circular capture buffer NOT including any bytes written to the extra space after the circular buffer. Capture input sample rate conversion (SRC) factor is the number of capture samples from the capture audio device converted to one sample in the capture buffer. If sample rate conversion is performed on the audio samples received from the capture device, because the capture device is running at a sample rate not supported by the AEC component, then this factor indicates the relationship between the sample rate of the capture device, and the sample rate of the data processed by the AEC algorithm. For example, in one implementation, the AEC algorithm always runs on 16 kHz audio samples. If the capture device is running at 16 kHz, then the capture input sample rate conversion factor is 1. If the capture device is running at 48 kHz, then the capture input sample rate conversion factor is 3. If the capture device is running at 44.1 kHz then the capture input sample rate conversion factor is 2.75625. Finally, if the capture device is running at 8 kHz, then the capture input sample rate conversion factor is 0.5. Capture input connection format number of channels is the number of channels of audio data in the capture audio samples from the capture audio device. Capture input connection format bytes per samples is the number of bytes per audio sample in the capture audio samples from the capture audio device. The capture buffer size is the size of the circular capture buffer 110, NOT including the extra space at the end of the buffer used to ensure that AEC can always process linear contiguous blocks of data. In one implementation, the initial calculation set forth in the Table 1 pseudo code above is performed using signed 64 bit integers. Thereafter, the remaining calculations are performed using 32 bit floating point arithmetic. As long as the result of the initial calculation, as well as the distance between the read and write pointers and the size of the capture buffer are all less than 24 bits, then 32 float calculations have enough precision to perform the calculations accurately. Otherwise, the floating point calculations could be performed using 64 bit floating point arithmetic.

The clock drift compensator 130 further calculates a render offset based, at least in part, upon the render position information. Table 2 shows pseudo code for exemplary render offset calculations:

TABLE 2 render offset = render output bytes processed − render hardware position
if ( render offset < 0 ) then render offset = 0
render offset /= render output sample rate conversion (SRC) factor
render offset /= render output connection format number of channels
render offset /= render output connection format bytes per sample
render offset += capture delay Render hardware position is the hardware position of the render device. Render output bytes processed is the total number of bytes loaded into the circular render buffer NOT including any bytes written to the extra space after the circular buffer. Render output sample rate conversion (SRC) factor is the number of render samples sent to the render audio device converted from one sample in the render buffer. If sample rate conversion is performed on the audio samples sent to the render device, because the render device is running at a sample rate not supported by the AEC component, then this factor indicates the relationship between the sample rate of the render device, and the sample rate of the data processed by the AEC algorithm. For example, in one implementation, the AEC algorithm runs on 16 kHz audio samples. If the render device is running at 16 kHz, then the render output sample rate conversion factor is 1. If the render device is running at 48 kHz, then the render output sample rate conversion factor is 3. If the render device is running at 44.1 kHz then the render output sample rate conversion factor is 2.75625. Render output connection format number of channels is the number of channels of audio data in the render audio samples sent to the render audio device. Render output connection format bytes per samples is the number of bytes per audio sample in the render audio samples sent to the render audio device. In one implementation, the initial calculation set forth in the Table 2 pseudo code above is performed using signed 64 bit integers. Thereafter, the remaining calculations are performed using 32 bit floating point arithmetic. As long as the result of the initial calculation, as well as the distance between the read and write pointers and the size of the render buffer are all less than 24 bits, then 32 float calculations have enough precision to perform the calculations accurately. Otherwise, the floating point calculations could be performed using 64 bit floating point arithmetic.

The render offset identifies the calculated ideal distance between the render write pointer and the render read pointer. Ideally the render offset would stay the same over time as the difference between the render write pointer and the render read pointer—no clock drift between the render D/A and the capture A/D. However, even in the instance where the render D/A and the capture A/D are both running at the same nominal clock speed, for example 44,100 Hz, one of the clocks may for example actually be running at 44,104 Hz relative to the other if the clocks are driven by different hardware crystals. The example sample rates above differ by about 91 ppm(parts per million). This means that for every 44100 samples created or consumed by 1 device, the other device is creating or consuming 44104 samples. Unless this difference is compensated for, the difference will build up over time, and the AEC algorithm will not be able to cancel the echo because it will be processing render and capture data that were not processed by the A/D and D/A devices at the same time.

Thus, in accordance with an aspect of the present invention, the difference between the render offset calculated by the clock drift compensator 130 and the difference between the render write pointer and the render read pointer can differ from 0.0. The difference between the ideal render offset and the actual difference between the render write and render read pointers is due to clock drift between the render device and the capture device. If no compensation for this drift is made, this difference can build up over time to a very large value. Note that the error value is calculated as the actual value of the difference between the render read and render write pointers, minus the ideal render offset as calculated in Table 2. This error can be positive or negative. If the render device clock is running faster than the capture device clock, then this error will be a positive value and will increase at a rate determined by the rate difference between the render and capture device clocks. If the render device clock is running slower than the capture device clock, then this error will be a negative value and will decrease at a rate determined by the rate difference between the render and capture device clocks. In order to compensate for any difference in the clock rates between the render and capture devices, the render read pointer is adjusted based on this error so that the information processed by the AEC component 140 from the render buffer 120 stays aligned in time with the capture information processed by the AEC component 140 from the capture buffer 110. In an alternate implementation, the capture read pointer can be adjusted instead of the render read pointer. This alternate implementation is illustrated in FIG. 1 as a dashed line from the clock drift compensator 130 to the capture buffer 110.

The method used to adjust the render read pointer based on the error, is to filter the raw error which is the difference between the render write pointer and the render read pointer, minus the ideal render offset. This filtering of the raw error is an important part of the clock drift compensation algorithm. The filter needs to adapt slowly enough to smooth out any coarseness in the granularity of the device positions. For example, currently USB devices can only report their position with an accuracy of 1 ms. This means the filter needs to adapt slowly enough so that errors in the position due to this 1 millisecond (ms) granularity are averaged out and do not cause erroneous adaptation of the speaker read pointer. Furthermore, the filtering algorithm should not introduce bias into the filtered error. The filter used on the raw error in one implementation is a single pole infinite impulse response (IIR) filter. Note that alternative low pass filtering implementations are possible and would also work. Possible alternatives include higher order IIR filters as well as finite impulse response (FIR) filters. Table 3 contains pseudo code for one implementation of the raw error calculations as well as the filtering of the raw error. Note that the write pointer is unwrapped if required as part of the calculations. The render write pointer is unwrapped when the render write pointer is less than the render read pointer in the circular render buffer. This occurs when the render write pointer has wrapped around from the end of the circular buffer to the beginning of the buffer, but the render read pointer has not yet wrapped. Accordingly, to obtain the unwrapped render write pointer, the size of the render buffer is added to the render write pointer. This render buffer size is the size of the circular render buffer 120, NOT including the extra space at the end of the render buffer 120 used to ensure that AEC can process linear contiguous blocks of data.

TABLE 3 temp write pointer = render write pointer
if ( temp write pointer < render read pointer )
    then temp write pointer += render buffer size
raw error = temp write pointer − render read pointer − render offset
error filter = 0.002
filtered error = (1−error filter) * filtered error + (error filter * raw error)

In this example, the time constant value 0.002 is used in the error filter. If this error filter time constant factor is too small, the filter will not adapt to differences between the ideal and actual render offsets fast enough to prevent the AEC component 140 from failing to converge because it is looking at the wrong render data when doing its calculations. If the error filter factor is too large (closer to 1), then the filter will not properly average out errors in positions with coarse resolutions, and the read pointer will be changed when it shouldn't be, and the AEC algorithm will fail to converge because of the jitter in the read pointer. The 0.002 value was chosen after extensive experimentation with different values used with many different render and capture devices. It provides sufficiently slow adaptation to properly smooth errors in USB audio device positions, but sufficiently rapid adaptation to track clocks that differ by significant ppm. Other time constant values could be used in alternate implementations, and would also work. This implementation can compensate for clocks that differ by more than 500 ppm. Note that the filtered error calculations are performed using 64 bit float operations (e.g., the filtered error is a double).

Another important consideration is that the above clock compensation algorithm should work correctly when the render device and the capture device are actually driven by the same clock and are running at about the same sample rate. The above implementation and pseudo code meet this requirement very well. The filtered error stays very close to zero when the render and capture clocks are the same, and the render read pointer is not adjusted. Another part of this implementation that helps ensure that the render read pointer is not adjusted when both the render and capture devices are driven by the same clock and are running at the same sample rates, is to only adjust the render read pointer when the filtered error has reached an integer value. As long as the filtered error is greater than −1.0 and less than 1.0, no adjustments are made to the render read pointer. Only when the filtered error is greater than or equal to 1.0 or less than or equal to −1.0, are any adjustments made to the render read pointer.

The render read pointer is adjusted by simply adding the integral valued filtered error (e.g., truncated filtered error) to the read pointer. The use of truncation (and not rounding) does affect the rate of adaptation of the render read pointer. In one implementation, the filtered error is truncated. Alternate implementations might use rounding, and that would also work. Only if the truncated filtered error is non zero is the truncated filtered error added to the render read pointer. The truncation is performed by casting the filtered error to an integer value, and by setting up the floating point hardware to truncate when doing conversions from float to integer. After the render read pointer is adjusted by the truncated filtered error, it is wrapped if required to ensure that it remains inside the circular render buffer. Note that because the truncated filtered error can be either positive or negative, wrapping is checked in both directions. If the render read pointer points to a location past the end of the circular buffer, the size of the circular buffer is subtracted from the render read pointer, and if the render read pointer points to a location before the start of the circular buffer, the size of the circular buffer is added to the render read pointer. This adjusted render read pointer can now be passed to the AEC component 140 and will properly stay positioned even when the capture device and the render device are driven by independent and slightly different clocks.

In an ideal world, where audio data was always sent to the audio render devices in time, and where capture data was always consumed from capture devices in time, the above calculations would be sufficient to enable the AEC component to stay converged. However, in some operating environments, it is impossible to guarantee that audio data will always be sent to the render device before it is needed, and that capture audio data will always be consumed from the capture device before it is overwritten. Because of this, and because the position information returned from the render and capture devices, is in terms of how many samples sent to the device have played, and how many samples have been captured into provided buffers, it is possible for the audio and therefore also the positions to glitch. When render data is not sent to the render device before it is required, the render device will typically play silence. Many times this results in an audible glitch. When this silence is played, the hardware render position is not moved, because the render device is not playing data sent to it by the system. What this means is that relative to a non glitched capture device, the render device clock just ran slow by an amount corresponding to the number of samples of silence played by the render device. This same type of phenomena can occur with capture devices as well. In that case, the system fails to provide the capture device with buffering required for generated samples, and when the capture device runs out of space into which to write the audio samples, it effectively deletes the samples, and they are never loaded into any buffer. In this case, the capture position also does not move, and appears to run slow relative to a non glitched render device by the number of samples that are not written into the capture buffer.

In one implementation, in order to handle these real world glitches in the positions received from the render and capture devices, additional functionality in the clock drift compensator 130 is provided. When either the render or capture devices glitch, there is a corresponding glitch in the raw error. In order to catch glitches, this implementation places a window around the optimal speaker read pointer as determined by the calculated render offset. If the actual speaker read pointer moves outside of that window, then a glitch is determined to have occurred and instead of filtering the new raw error, the speaker read pointer is immediately set to the now optimal location. In addition, the filtered error is set to zero. The size of the window that is placed around the optimal read pointer determines how small a glitch can be detected. However, the size of the window also limits the rate of adaptation that can be achieved by the clock drift compensator. In this implementation, there is a window of 5 ms worth of samples on either side of the ideal render read pointer. As long as the actual render read pointer stays within this window, it is modified with the filtered error. Whenever the actual render read pointer gets outside of that window, it is immediately set back to the ideal render read location. In an alternate implementation, the raw error is compared with previous values of the raw error, and used to determine when a glitch occurs. That has the advantage of not limiting directly how far off the actual read pointer can get from the ideal read pointer.

The clock drift compensator also can be forced to set the render read pointer to its ideal location by setting a flag. When either the flag is set, or the render read pointer is outside of the window around the ideal render read pointer location, the render read pointer is set to its ideal location. This flag is used during startup of the clock drift compensator, to set the initial render read pointer. Clients can also set this flag, so they can cause the render read pointer to be set to its ideal location.

Pseudo code for adjustment of the render read pointer including glitch detection follows in Table 4. Note that the unwrapped temp write pointer from the Table 3 pseudo code is used in these calculations.

TABLE 4 if ((render read pointer + render offset + ½ threshold window) <
temp write pointer) OR (render read pointer + render offset − ½ threshold
window) > temp write pointer) OR (force resynchronization flag ==
TRUE))
   then
      render read pointer = temp write pointer − render offset;
      if ( render read pointer < render buffer base )

TABLE 4-continued

```
        render read pointer + = render buffer size
    if ( render read pointer > render buffer top )
        render read pointer - = render buffer size
    filtered error = 0;
else
    render read pointer = render read pointer + (LONG) filtered
    error;
    if ( render read pointer < render buffer base )
        render read pointer + = render buffer size
    if ( render read pointer > render buffer top )
        render read pointer - = render buffer size
    filtered error = filtered error - (LONG) filtered
    error;
```

Note that in both cases above when the render read pointer is changed, it is also wrapped if required, so that the change to the render read pointer does not cause the render read pointer to point to an area outside of the render buffer. In order to ensure this, the render read pointer is checked to see if it points to a location below the start of the render buffer. If so, then the size of the render buffer is added to the render read pointer. The render pointer is also checked to see if it points to a location after the end of the render circular buffer (not including the extra space for linearizing AEC component buffer processing). If so, then the size of the render buffer is subtracted from the render read pointer. In this way the modified render read pointers are kept within the boundaries of the circular render buffer.

Note that in the last line of the pseudo code in Table 4 the remaining non integer part of the filtered error is tracked in the filtered error. This is done by subtracting the integer part of the filtered error from the filtered error. This ensures that any remaining fractional part is kept in the filtered error, ready for the next iteration of the clock drift compensation system algorithm.

The AEC component 140 performs acoustic echo cancellation of the capture input information based, at least in part, upon the adjusted render read pointer. The AEC component 140 can include an AEC algorithm that can be used by application(s), such as video conferencing system(s) and/or speech recognition engine(s) to reduce the echo due to acoustic feedback from a speaker (not shown) to a microphone (not shown). For example, the AEC algorithm can use an adaptive filter to model the impulse response of the room. The echo is either removed (cancelled) or reduced once the adaptive filter converges by subtracting the output of the adaptive filter from the audio input signal (e.g., by a differential component (not shown)).

Referring briefly to FIG. 2, a capture driver (not shown) facilitates communication between the capture device 150 and the capture buffer 110 and/or an optional splitter 180. Similarly, render driver(s) (not shown) facilitate communication between the render device(s) 160 and the render buffer 120.

The mixer 170 mixes multiple audio streams. Additionally, the mixer 170 can perform bit depth format conversions, volume scaling, sample-rate conversion, and/or channel mapping. The splitter 180 creates two or more streams from a single input capture stream.

While FIG. 1 and FIG. 2 are block diagrams illustrating components for the acoustic echo cancellation clock drift compensation system 100, it is to be understood that the capture buffer 110, the render buffer 120, the clock drift compensator 130, the AEC component 140, the driver (not shown) for the capture device 150, the driver(s) (not shown) for the render device(s) 160, the mixer 170 and the splitter 180 can be implemented as one or more computer components, as that term is defined herein. Thus, the computer executable components operable to implement the acoustic echo cancellation clock drift compensation system 100, the capture buffer 110, the render buffer 120, the clock drift compensator 130, the AEC component 140, the driver for the capture device 150, the driver(s) for the render device(s) 160, the mixer 170 and the splitter 180 can be stored on computer readable media including, but not limited to, RAM (random access memory), an ASIC (application specific integrated circuit), CD (compact disc), DVD (digital video disk), ROM (read only memory), floppy disk, hard disk, EEPROM (electrically erasable programmable read only memory), Flash RAM, and memory stick in accordance with the present invention.

In view of the exemplary systems shown and described above, methodologies that may be implemented in accordance with the present invention may be better understood by referring to the flow charts of FIGS. 5, 6, 7, 8, 9, 10 and 11. While, for purposes of simplicity of explanation, the methodologies are shown and described as a series of blocks, it is to be understood that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIGS. 5, 6, 7, 8 and 9, a method 500 for acoustic echo cancellation clock drift compensation in accordance with an aspect of the present invention is illustrated (e.g. based, at least in part, upon the pseudo code provided above). At 504, a determination is made as to whether AEC is enabled and there is enough data on capture and render to process. If the determination at 504 is NO, processing continues at 580. If the determination at 504 is YES, at 508, capture position information is gathered (e.g., read) from the capture buffer 110 as well as from the capture device 150 and/or from the driver for the capture device 150 (e.g., capture write pointer, capture read pointer, capture input bytes processed and capture hardware position). At 512, render position information is gathered (e.g., read) from the render buffer 120 as well as from the render device 160 or from the driver for the render device 160. (e.g. render write pointer, render read pointer, render output bytes processed and render hardware position). At 516, a capture delay is calculated. For example, the capture delay can be calculated based on the pseudo code included in Table 1. At 520, a render offset is calculated. For example, the render offset can be calculated based on the pseudo code included in Table 2.

At 524 the render offset is limited so that it cannot move the read pointer outside of the render buffer. The render offset can be limited based on the size of the render circular buffer, and the amount of data used by the AEC component when it is called to make its calculations. In one implementation, the AEC component uses 6 frames of data of FrameSize (256) samples per frame. Five of those frames are previous to the render read pointer, and 1 frame follows the render read pointer. Therefore the render offset can be limited to the size of the render buffer in samples minus 5 frames of FrameSize samples each. This ensures that a large positive render offset will not be able to move the render read pointer outside of the render buffer. In this implementation, when the render offset is larger than this, the invalid render offset is ignored by setting the render offset to the actual difference between the unwrapped speaker write pointer and the render read pointer. This ensures that the calculated raw error is zero, and that over time the filtered error will also go towards zero. At 528, a raw error is calculated. At 532, a filtered error is calculated. For example, the raw and filtered errors can be calculated based on the pseudo code included in Table 3.

At 536, a determination is made as to whether either a resync is being forced or the actual render read pointer is outside a threshold window of the ideal render read pointer as determined by the calculated render offset. If the determination at 536 is NO, processing continues at 540. If the determination at 536 is YES, then processing continues at 550.

At 540, a determination is made whether the filtered error can be truncated to a non zero integer value (e.g., by simply zeroing the fractional part of the filtered error—which is a double). If the determination at 540 is NO (e.g., the truncated filtered error is zero), then no adjustment needs to be made at this time to the speaker read pointer, and processing continues at 560. If the determination at 540 is YES (e.g., the truncated filtered error is non zero), then at 542 a determination is made as to whether there is enough space between the render read pointer and the render write pointer to adjust the render read pointer. If adjusting the render read pointer will end up causing the render read pointer to move past the render write pointer when the render write pointer is adjusted after the AEC component processing, then there is not space to adjust the render read pointer. If there is not space to adjust the render read pointer, then adjusting the render read pointer is skipped on this iteration and processing continues at 560. If the determination at 542 is YES (e.g., there is space in the render buffer for us to adjust the render read pointer), then at 544, the render read pointer is loaded with the render read pointer plus the truncated filtered error. At 546, the total amount the render read pointer has been adjusted as well as the total amount the render hardware position has moved between adjustments is tracked. At 548, the filtered error is loaded with the filtered error—(LONG) filtered error. This ensures that the remaining fractional part of the filtered error is retained in filtered error ready for the next iteration. Pseudo code for implementing most of the above calculations can be found in Table 4.

If the determination at 536 is YES, then at 550, the render read pointer is loaded with the render write pointer minus the render offset. Additionally, if a circular render buffer is employed, the render read pointer is wrapped, if necessary. At 552, the filtered error is set to zero. Note that these calculations may be performed based on the pseudo code in Table 4. At 554, a determination is made whether the render read pointer moved outside of the window around the ideal render read pointer location because of a hardware position glitch, or because the clock tracking algorithm was unable to adjust the render read pointer fast enough to keep up with the difference in the render and capture clock rates. This determination is made by comparing the raw error for this iteration with the last raw error calculated. At 554, if either the resynchronization of the render read pointer was forced by a flag, or the raw error is outside a window (e.g., 3 ms) of the last raw error calculated, then the amount the render read pointer is adjusted is not tracked and processing continues at 558. If the raw error for this iteration is within, for example, 3 ms of the raw error of the last iteration, and a render read pointer resynchronize was not forced, then the render read pointer has moved outside of the window around the ideal render offset due to an inability to keep up with the difference between the render and capture clocks, so the amount that the render read pointer is adjusted is counted when it is forced it to its ideal location. This is tracked so that an accurate estimate of the difference between the render and capture clocks can be made. At 556, both the amount the render read pointer was adjusted as well as how much the render hardware position has moved since the last adjustment to the render read pointer are tracked. At 558, the raw error is set to zero, and the current render hardware position is saved.

At 560, the AEC algorithm is run. At 562, the render read pointer and the capture read pointer are updated by the amount of data processed by the AEC component and processing is complete until additional data is available to be sent to the render or capture buffers. In one implementation the render and capture read pointers are updated by one FrameSize worth of samples (256 samples).

At 580, a determination is made as to whether the system is in pass through mode. Pass through mode means that either capture or render is running, but not both. Therefore the data is not processed through the AEC component, but rather the render data or the capture data are passed through untouched. If the determination at 580 is YES, at 584, any available capture in data is copied to the capture out pin and then at 586, the render read pointer and/or the capture read pointers are updated. Processing is then complete until additional data is available to be sent to the render or capture buffers. If the determination at 580 is NO, processing is complete until additional data is available to be sent to the render or capture buffers.

Figure 10:
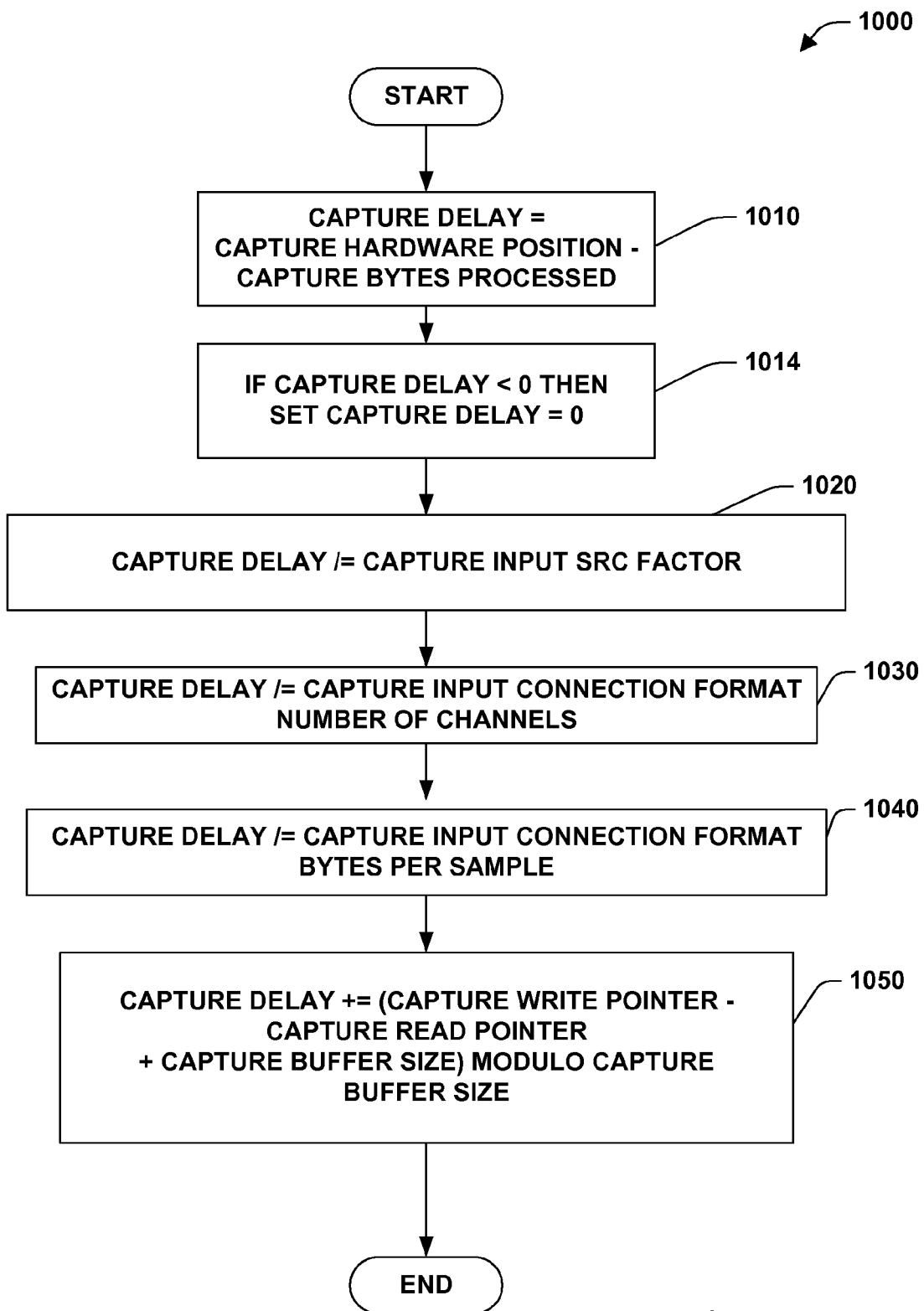
FIG. 10 is a flow chart illustrating a method for calculating a capture delay in accordance with an aspect of the present invention.

In FIG. 10, a method 1000 for calculating a capture delay in accordance with an aspect of the present invention is illustrated. Note that Table 1 contains pseudo code for FIG. 10, and the explanation of that pseudo code also applies to FIG. 10. The capture delay is the number of samples between the read pointer of the capture buffer, and the capture hardware position in terms of the format of the capture buffer. At 1010, capture delay is calculated as: capture delay=capture hardware position—capture bytes processed. At 1014, the capture delay is set to zero if it is negative. Normally this will not happen, but it is possible if the driver for the capture device reports an incorrect position. The capture bytes processed is a count of all the data that have been sent by the driver for the capture device. The hardware capture position should always be greater than or equal to this number. If that is the case, then capture delay will not be negative. Only if the driver for the device says the hardware position is less than the number of samples it has actually already sent us will capture delay be negative. However, drivers can sometimes report incorrect positions, so if capture delay is negative, it is set to zero. The work represented in blocks 1020, 1030, and 1040 is all to convert the capture delay which is in bytes at the sample rate of the capture device, and the sample bit depth of the capture device, into a capture delay that is in terms of a count of samples of the same format as those in the capture buffer. To make this conversion, the number of channels, bytes per sample, and sample rate of the capture device are factored out. At 1020, the sample rate difference is factored out: capture delay/=capture input sample rate conversion (SRC) factor. Next, at 1030, the number of channels is factored out since only a single channel of capture data is loaded into the capture buffer. Thus: capture delay/=capture input connection format number of capture channels. At 1040, the bytes per sample of the capture data is factored out: capture delay/=capture input connection format number of bytes per sample. At this point, capture delay contains the number of samples in terms of the capture buffer sample rate between the capture hardware position, and the capture write pointer. Next, at 1050, the distance between the capture read pointer and the capture write pointer is added to the capture delay. Thus: capture delay+=(capture write pointer−capture read pointer+capture buffer size) MODULO (capture buffer size). Note that this capture buffer size is the size of the circular capture buffer NOT including the extra space at the end to linearize the AEC data processing. At this point, capture delay now has the distance in samples between the capture read pointer, and the capture hardware position.

Figure 11:
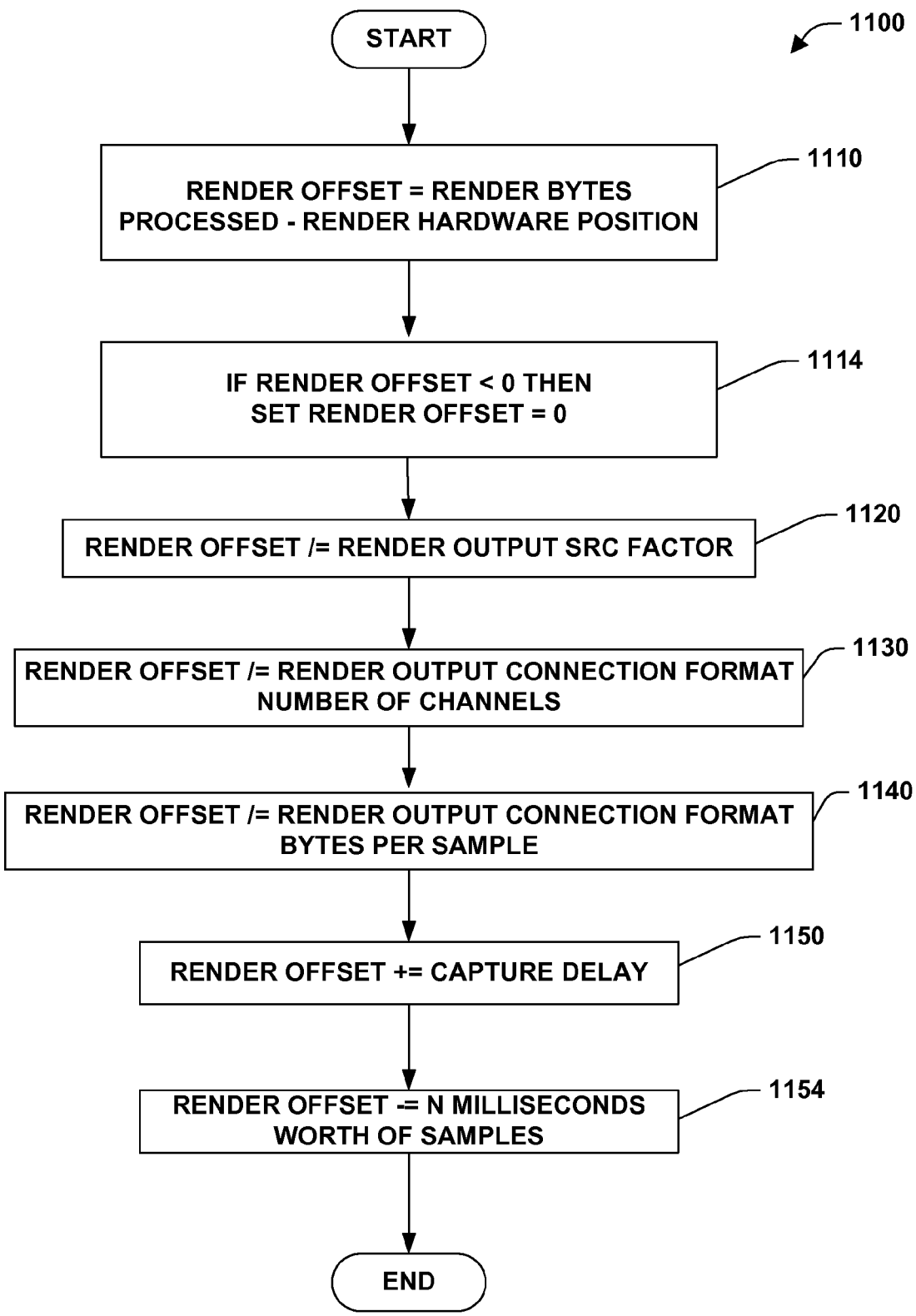
FIG. 11 is a flow chart illustrating a method for calculating a render offset in accordance with an aspect of the present invention.

Turning next to FIG. 11, a method 1100 for calculating a render offset in accordance with an aspect of the present invention is illustrated. At 1110, render offset is calculated as: render offset=render bytes processed−render hardware position. At 1114, if the render offset is negative, it is set to zero. This will only happen if the driver reports a position that is larger than the number of samples sent to it to be played. At 1120, render offset is assigned: render offset/=render output data sample rate conversion (SRC) factor. At 1130, render offset is assigned: render offset/=render output connection format number of channels. At 1140, render offset is assigned: render offset/=render output connection format bytes per sample. At 1150, render offset is assigned: render offset+=capture delay. Render offset now has the ideal distance in samples between the render read pointer and the render write pointer.

At 1154 the render offset is reduced (e.g. by 8 ms worth of samples). This is done to ensure that the recent samples of the render signal that may be present in the capture data processed by the AEC component will also be present in the render data that is processed by the AEC component. This means that the length of the echo that can be cancelled from the capture signal is reduced (e.g., by 8 ms); however, it is worth losing a slight amount of echo cancellation to ensure that recent render samples that may have affected the capture signal are present in the render data processed by the AEC component. Also, because of the window placed around the ideal render read pointer, the render read pointer may lag the ideal render read pointer location (e.g., by up to 5 ms). Shifting the render offset up front ensures that even in the case where the render read pointer is lagging the ideal render pointer location by 5 ms, there is still a 3 ms cushion to ensure that the AEC component sees all of the recent render samples that may be present in some form in the capture signal. Note that if the window around the ideal render read pointer location is increased, then the amount that the render offset is shifted here should also increase. If it is known in advance that the render read pointer will lead the ideal render read location as determined by the calculated render offset, then the shift of the render offset can be reduced. For example, it might be shifted by only 3 ms. If it is known in advance that the render read pointer will lag the ideal render read location as determined by the calculated render offset, then the render offset can be shifted by the appropriate amount. In one implementation this could be 8 ms, 3 ms+the 5 ms window around the ideal render read location. In other implementations, if an estimate is known in advance of how much the render read position will lag the ideal position, then render offset can be shifted by that amount plus a safety margin like 3 ms.

One reason always reducing the render offset by a small safety margin like 3 ms, is because of the reduced hardware position resolution available on some devices like USB devices. On USB 1.0 devices, the position resolution is only 1 ms, so even if the position is correct it can be off by up to 1 ms. This means if the render read pointer is placed at its exact ideal location, it can be missing a few samples (up to 16—for 1 ms of a 16 kHz sampled signal) that were present in the capture data, but not visible in the render data. Also, some devices interpolate their positions, and other devices sometimes return positions that are off by a few samples. Reducing the render offset helps ensure that the AEC component sees the most recent samples of the render signal that may be present in the capture signal even when the device positions are slightly inaccurate.

Figure 12:
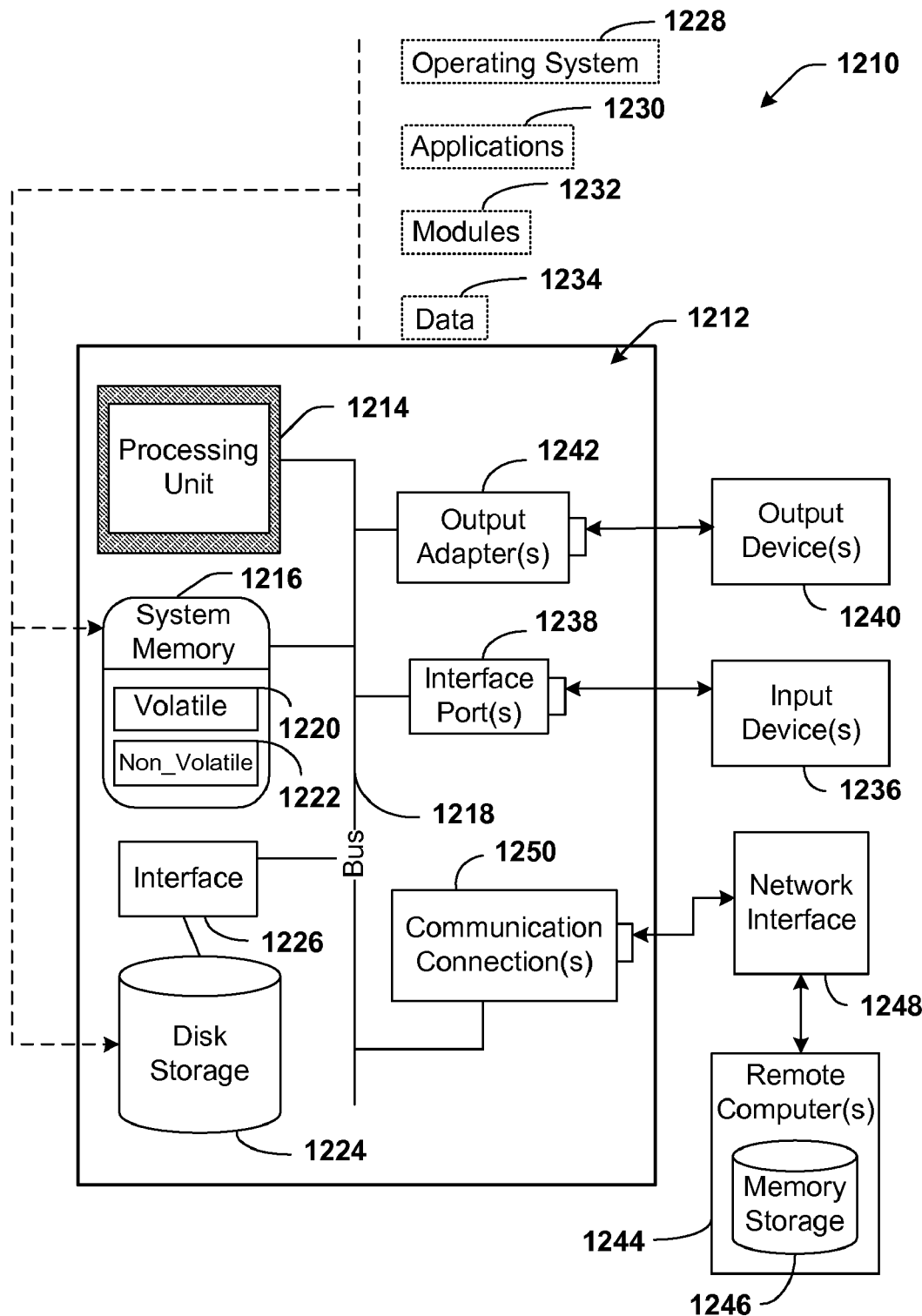
FIG. 12 illustrates an example operating environment in which the present invention may function.

In order to provide additional context for various aspects of the present invention, FIG. 12 and the following discussion are intended to provide a brief, general description of a suitable operating environment 1210 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be understood that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, sound card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, a universal serial bus (USB), and a 1394 bus. Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor coupled to computer-readable storage media containing instructions executable by the processor for implementing the following:
    an acoustic echo cancellation (AEC) component for controlling an acoustic echo;
    a capture buffer that includes capture data, the capture buffer having a capture write pointer and a capture read pointer;
    a render buffer that includes render data, the render buffer having a render write pointer and a render read pointer; and
    a clock drift compensator that adjusts the render read pointer, wherein the clock drift compensator adjusts the render read pointer by adding an error value to the render read pointer,
    wherein the error value is based, at least in part, on an actual difference between the render read pointer and the render write pointer, as compared with an ideal render offset between the render read pointer and the render write pointer,
    wherein the render read pointer is adjusted by adding the error value to the render read pointer so that the render data processed by the AEC component from the render buffer stays aligned in time with the capture data processed by the AEC component from the capture buffer to perform acoustic echo cancellation of the capture data using the render data.

2. The system of claim 1,
    wherein the error valued used for adjustment of the render read pointer is further based, at least in part, upon a filtered error determined by filtering a raw error determined based on the actual difference between the render read pointer and the render write pointer as compared with the ideal render offset, wherein the filtered error filters the raw error using a constant to determine the filtered error so as to control an adaptation rate for adjustment of the render read pointer.

3. The system of claim 2, wherein the filtered error is determined based upon the equation:

filtered error=(1−error filter)*filtered error+(error filter*raw error), where error filter is the constant value and the raw error is determined based on the actual difference between the render read pointer and the render write pointer as compared with the ideal render offset.

4. The system of claim 1, wherein the clock drift compensator identifies a render glitch by determining that the render read pointer is outside of a threshold range from an ideal render read pointer location.

5. The system of claim 1, wherein the clock drift compensator compensates for the render glitch by immediately setting the render read pointer to the ideal render read pointer location upon identification of the render glitch.

6. The system of claim 1, wherein the clock drift compensator identifies a capture glitch by determining that the capture write pointer is outside of a threshold range from an ideal capture write pointer location.

7. The system of claim 6, wherein the clock drift compensator compensates for the render glitch by immediately setting the capture read pointer to the ideal capture write pointer location upon identification of the capture glitch.

8. The system of claim 1 further comprising at least one of a render device, a capture device, or a mixer.

9. The system of claim 1, further comprising a splitter.

10. The system of claim 1, wherein the capture buffer comprises information associated with at least one of a telephone, a speaker phone or a microphone.

11. The system of claim 1, wherein the render buffer comprises information to be utilized by a render device.

12. The system of claim 11, wherein the render device comprises a digital-to-analog converter connected to an output render transducer.

13. A method implemented by a processor executing instructions stored in computer-readable storage media, the method comprising:
   receiving capture position information;
   receiving render position information, the render position information including a render read pointer and a render write pointer;
   calculating a render offset;
   calculating, by the processor, a raw error by comparing an actual difference between the render read pointer and the render write pointer with the calculated render offset;
   adjusting the render read pointer by adding an error value based upon the raw error to the render read pointer so that render data processed by an acoustic echo cancellation (AEC) component stays aligned in time with capture data processed by the AEC component to perform acoustic echo cancellation of the capture data using the render data; and
   employing the adjusted render read pointer and capture read pointer for acoustic echo cancellation.

14. The method of claim 13, wherein receiving the capture position information comprises at least one of the following acts:
   receiving information associated with a capture read pointer;
   receiving information associated with a capture write pointer;
   receiving information associated with capture bytes processed; or,
   receiving information associated with a capture hardware position.

15. The method of claim 13,
   wherein the error valued used for adjustment of the render read pointer is further based upon a filtered error determined by filtering the raw error determined based on the actual difference between the render read pointer and the render write pointer compared with the calculated render offset,
   wherein the filtered error filters the raw error using a constant to determine the filtered error so as to control an adaptation rate for adjustment of the render read pointer.

16. The method of claim 13, wherein receiving the render position information comprises at least one of the following acts:
   receiving information associated with the render write pointer;
   receiving information associated with the render read pointer;
   receiving information associated with render bytes process; or,
   receiving information associated with a render hardware position.

17. The method of claim 16, wherein calculating the render offset comprises at least one of the following acts:
   calculating a difference between the render out bytes processed and the render hardware position;
   adjusting the render offset with a render sample rate conversion factor;
   adjusting the render offset with a render connection format number of channels factor;
   adjusting the render offset with a render connection format bytes per sample factor; or,
   adjusting the render offset relative to the capture delay.

18. A system, comprising:
   a render device having a digital-to-analog converter driven by a first clock signal;
   a capture device having an analog-to-digital converter driven by a second clock signal, wherein the second clock signal runs at a different rate than the first clock signal;
   an acoustic echo cancellation (AEC) component for controlling an acoustic echo;
   a capture buffer for buffering capture data received from the capture device according to the second clock signal, the capture buffer having a capture write pointer and a capture read pointer;
   a render buffer for buffering render data consumed by the render device according to the first clock signal, the render buffer having a render write pointer and a render read pointer; and
   a clock drift compensator implemented by a processor executing instructions stored in computer-readable storage media, the clock drift compensator compensating for clock drift between the first clock signal and the second clock signal by adjusting the render read pointer, wherein the render read pointer is adjusted by adding an error value to the render read pointer,
   wherein the error value is based on an actual difference between the render read pointer and the render write pointer, as compared with a calculated ideal render offset between the render read pointer and the render write pointer, wherein the render read pointer is adjusted by adding the error value to the render read pointer so that the render data processed by the AEC component from the render buffer stays aligned in time with the capture data processed by the AEC component from the capture buffer to perform acoustic echo cancellation of the capture data using the render data, wherein the AEC component performs acoustic echo cancellation of the capture data utilizing the adjusted render read pointer and capture read pointer.

19. The system of claim 18, wherein the error valued used for adjusting the render read pointer is further based upon a filtered error determined by filtering a raw error determined based on the actual difference between the render read pointer and the render write pointer as compared with the ideal render offset, wherein the filtered error filters the raw error using a constant to determine the filtered error so as to control an adaptation rate for adjustment of the render read pointer.

20. The system of claim 1, wherein the clock drift compensator identifies a render glitch by determining that the render read pointer is outside of a threshold range from an ideal render read pointer location, wherein the clock drift compensator compensates for the render glitch by immediately setting the render read pointer to the ideal render read pointer location upon identification of the render glitch.

* * * * *